United States Patent [19]

Lacy

[11] 4,223,258
[45] Sep. 16, 1980

[54] DIGITALLY CONTROLLED SERVO SYSTEM

[75] Inventor: Garry T. Lacy, Claremont, Calif.

[73] Assignee: General Dynamics Corporation, Pomona, Calif.

[21] Appl. No.: 21,381

[22] Filed: Mar. 19, 1979

[51] Int. Cl.³ .................................................. G05B 11/28
[52] U.S. Cl. ................................... 318/599; 318/601; 318/621
[58] Field of Search ............... 318/596, 599, 162, 341, 318/604, 621, 601

[56] References Cited

U.S. PATENT DOCUMENTS

| | | | |
|---|---|---|---|
| 2,775,727 | 12/1956 | Kernahan et al. | 318/601 |
| 2,909,717 | 10/1959 | Hulls et al. | 318/601 |
| 2,953,773 | 9/1960 | Dinicolantonio | 340/146.2 |
| 2,971,141 | 2/1961 | Gevas | 318/601 |
| 2,997,638 | 8/1961 | Brittain | 318/601 X |
| 3,183,421 | 5/1965 | Herchenroeder | 318/601 X |
| 3,189,805 | 6/1965 | Poepsel et al. | 318/601 X |
| 3,239,735 | 3/1966 | Raider et al. | 318/601 |
| 3,377,533 | 4/1968 | Lenz | 318/603 |
| 3,665,500 | 5/1972 | Lewis | 318/596 |
| 3,739,158 | 6/1973 | Woodward | 318/599 X |
| 3,752,969 | 8/1973 | Kiffmeyer | 318/601 X |
| 3,962,620 | 6/1976 | Dion | 318/599 |

*Primary Examiner*—B. Dobeck
*Attorney, Agent, or Firm*—Neil F. Martin; Edward W. Callan; Edward B. Johnson

[57] ABSTRACT

A servo system wherein a servo motor is continuously controlled in response to a pulse width modulated digital command signal is disclosed. A servo motor having a variable output is controlled in response to a variable amplitude error signal. A pulse code converter converts a pulse code modulated digital command signal to provide a pulse width modulated digital command signal for controlling the variable output of the servo motor. The digital command signal is provided at a predetermined frame rate in response to a frame pulse signal. A feedback transducer and network senses the variable output of the servo motor and provides a variable amplitude feedback signal that is indicative of the variable output. A synchronous pulse forming network converts the variable amplitude feedback signal to a proportional pulse width modulated digital feedback signal. The digital feedback signal is provided at the predetermined frame rate and in synchronization with the digital command signal. The digital command signal is summed with the digital feedback signal to provide a digital error signal; and a pulse width-to-amplitude demodulator converts the digital error signal to a continuous variable ampliude error signal for continuously controlling the variable output of the servo motor. The pulse width-to-amplitude demodulator includes an integrator for integrating the digital error signal to provide an integrated error signal; and a zero order hold sampler for sampling the amplitude of the integrated error signal to provide the continuous variable amplitude output signal. The sampled amplitude is held for a full frame period as defined by the frame pulse signal.

6 Claims, 5 Drawing Figures

DIGITALLY CONTROLLED SERVO SYSTEM

BACKGROUND OF THE INVENTION

The present invention generally pertains to servo systems and is particularly directed to a system for continuously controlling a servo motor in response to a digital command signal.

In controlling a continuously controlled analog output device, such a servo motor, in response to a digital command signal, a digital-to-analog (D/A) conversion must take place somewhere in the system. The D/A conversion inherently causes phase lag because of the discreet interval sampling process which occurs at a digital signal processor frame rate, even when the D/A conversion is performed within the servo loop; and therefore the sampling phase lag adds directly to system errors. This phase lag is a serious difficulty against obtaining high performance in digitally controlled systems, such as in the implementation of digital controllers to meet tactical missle guidance and control requirements.

It is an object of the present invention to provide an improved digitally controlled servo system wherein the phase lag is reduced significantly to enable the system to be used in missle applications, with high performance, low power drain, and minimum cost.

SUMMARY OF THE INVENTION

The present invention is a servo system wherein a servo motor is continuously controlled in response to a pulse width modulated digital command signal. A servo system in accordance with the present invention includes a servo motor having a variable output that is controlled in response to a variable amplitude error signal; a pulse code converter for providing a pulse width modulated digital command signal for controlling the variable output of the motor, wherein the digital command signal is provided at a predetermined frame rate in response to a frame pulse signal; a feedback transducer and network for sensing the variable output of the servo motor and for providing a variable amplitude feedback signal indicative of the variable output; a synchronous pulse forming network for converting the variable amplitude feedback signal to a proportional pulse width modulated digital feedback signal, wherein the digital feedback signal is provided at the predetermined frame rate and in synchronization with the digital command signal; a summing junction for summing the digital command signal with the digital feedback signal to provide a digital error signal; and a pulse width-to-amplitude demodulator for converting the digital error signal to a continuous variable amplitude error signal for continuously controlling the variable output of the servo motor.

Preferably the pulse width-to-amplitude demodulator includes an integrator for integrating the digital error signal to provide an integrated error signal; and a zero order hold sampler for sampling the amplitude of the integrated error signal to provide the continuous variable amplitude output signal, wherein the sampled amplitude is held for a full frame period as defined by the frame pulse signal.

It also is preferable that the integrator include a first switch for enabling such integration and for resetting the integrator; that the zero order hold sampler include a second switch for enabling such sampling; and that the pulse width-to-amplitude demodulator include a dual monostable multivibrator for providing a first switching signal having a duration greater than the maximum duration of any pulse in the pulse width modulated digital error signal, and a second switching signal having a duration that is slightly less than the duration of the first switching signal; and an exclusive OR logic element having its inputs connected to receive the first and second switching signals and its output connected to the second switch; wherein the multivibrator also is connected to provide the first switching signal to the first switch for causing the first switch to enable the integrator to integrate the digital error signal over the duration of the first switching signal and to reset the integrator for integrating each successive pulse in the digital error signal upon the termination of the first switching signal, and to provide the first and second switching signal to the exclusive OR logic element in a sequence to cause the second switch to enable the zero order hold sampler to sample the integrated error signal during a short interval just before the integrator is reset.

By providing D/A interfacing in the servo loop ahead of the analog power elements, the need to use more complicated, costly, and lower performing stepping motors or incremental mechanical devices is avoided. Thus, the servo system of the present invention offers higher performance at lower cost than an all digital system, with power elements.

The D/A interface demodulation process is important to achieve low power drain. The amplitude sensitivity of the continuous variable amplitude error signal with respect to the digital error signal is essentially linear with no dead zone. This feature allows the overall servo system to operate in a linear fashion with no internally generated signal perturbations other than a zero order hold "staircase" granularity in the continuous variable amplitude error signal, which smooths to zero as the digital error signal goes to zero. Linearization of the servo system by such means avoids power consuming, heat generating, limit cycles which can result with other known nonlinear means of pulse width demodulation, such as pulse structuring and on-off power controlling techniques.

BRIEF DESCRIPTION OF THE DRAWING

FIG. 1A is a timing diagram showing the relationship between the digital command signal, the digital feedback signal and the digital error signal in the servo system of FIG. 1.

DESCRIPTION OF THE PREFERRED EMBODIMENT

Figure 1:
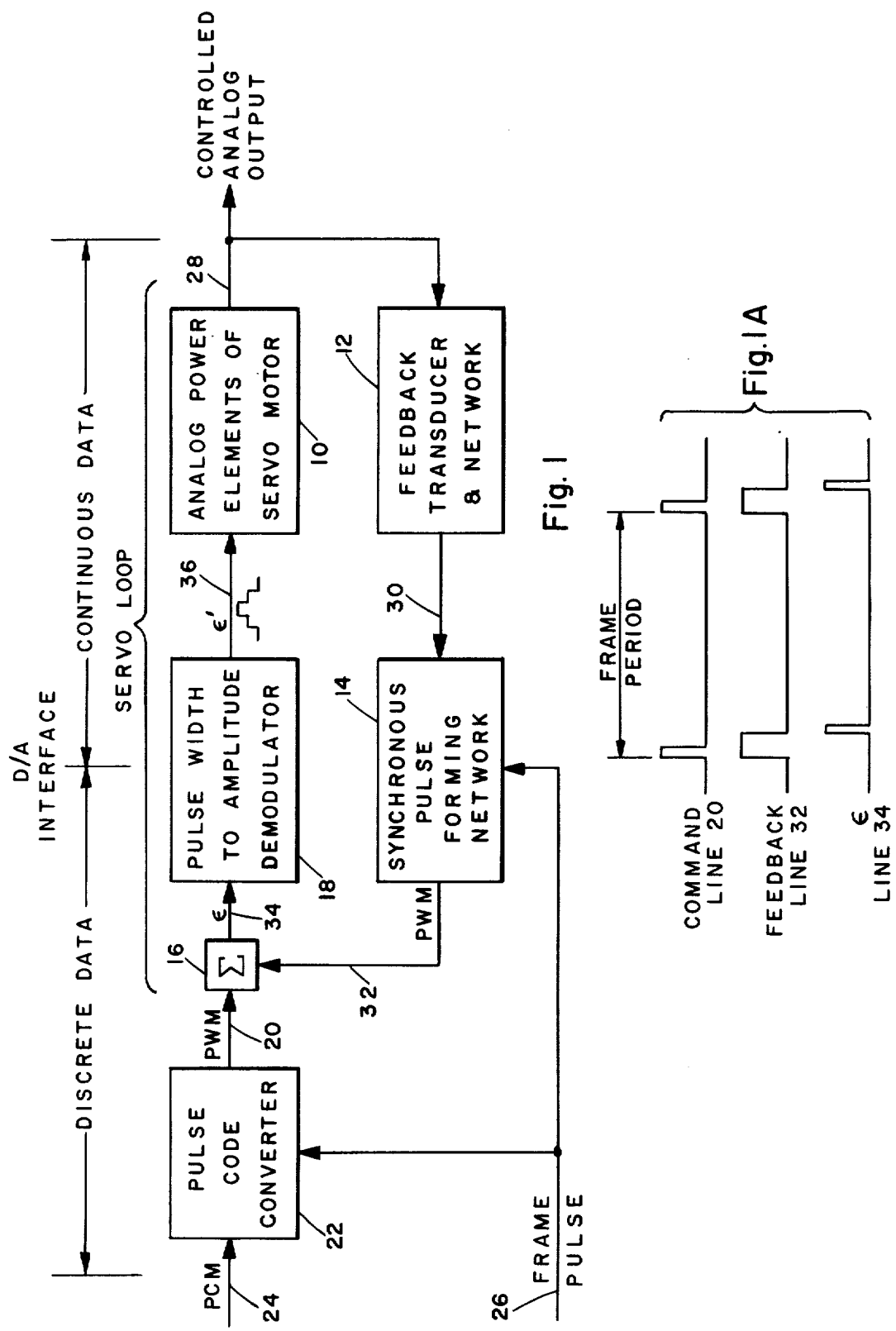
FIG. 1 is a block diagram of the servo system of the present invention.

Referring to FIG. 1, the servo system of the present invention essentially includes the analog power elements of a servo motor 10, a feedback transducer and network 12, a synchronous pulse forming network 14, a summing junction 16 and a pulse width to amplitude demodulator 18. The system is controlled in response to a pulse width modulated (PWM) digital command signal provided on line 20 from a pulse code converter 22. The pulse code converter 22 provides the PWM digital command signal on line 20 by converting a pulse code modulated (PCM) digital command signal on line 24. The system input PCM command signal on line 24 typically is encoded with a binary position pulse code (ie. multiple pulse positional representation of a binary number). To provide the PWM digital command signal on line 20 to the servo summing junction 18, the pulse code converter converts the code pulses of a binary number into a single pulse, the width of which represents the value of the number. The PWM digital command signal is provided on line 20 at a predetermined frame rate in response to a frame signal provided the pulse code converter 22 on line 26. The command information is represented by the width of each incoming pulse. The frame pulse signal on line 26 is provided from the same digital processor (not shown) as the pulse code modulated digital command signal on line 24 and is synchronized therewith. The predetermined frame rate is the rate at which digital commands from the digital processor are updated.

The servo motor provides a controlled variable analog output 28. The controlled variable output of the servo motor is position, rate-of-change-of position, or torque (force), such as is required for actuation of missile airframe flight controls, stable platforms and antenna gimbals.

Within the servo motor, the power elements 10 may be electromechanical, electrohydraulic or electropneumatic analog means of actuation.

The feedback transducer and network 12 senses the variable output 28 and provides a variable amplitude feedback signal on line 30 that is indicative of the variable output 28.

The synchronous pulse forming network 14 converts the variable amplitude feedback signal on line 30 to provide a proportional pulse width modulated digital feedback signal on line 32. The digital feedback signal on line 32 is provided at the predetermined frame rate in accordance with the frame pulse signal on line 26, and therefore is in synchronization with the pulse width modulated digital command signal on line 20. Alternatively, such synchronization may be achieved by sensing the rate of the digital command signal on line 20 with a pulse detecting network (not shown) and providing the detected pulse rate to the synchronous pulse forming network 14.

The feedback transducing element of the feedback transducer and network 10 may consist of a variable resistor, capacitor or inductor situated within the synchronous pulse forming network 14 to directly control the digital feedback signal pulse width. Alternatively, feedback transducing may be accomplished by means of a device to provide signal control of the pulse width formed by the synchronous pulse forming network 14, such as voltage dividing or generating transducers or an analog-to-digital encoder. Configuration of the synchronous pulse forming network 14 is dependent upon the type of feedback transducing element used. Synchronization of the synchronous pulse forming network 14, when the detected incoming pulse option is used, may be mechanized by means of a derivative, or phase lock network.

The digital command signal on line 20 is summed with the digital feedback signal on line 32 at the summing junction 16 to provide a digital error signal $\epsilon$ on line 34.

The pulse width-to-amplitude demodulator 18 converts the digital error signal $\epsilon$ on line 34 to a continuous variable amplitude error signal $\epsilon'$ on line 36 for continuously controlling the variable output 28 of the servo motor. The digital error signal $\epsilon$ on line 34 is a pulse having a width that is proportional to the difference in widths of the pulses of the digital command signal on line 20 and the digital feedback signal on line 32. The polarity of the digital error signal $\epsilon$ on line 34 depends upon whether the feedback signal pulse width is larger or smaller than the command signal pulse width. The relationship between the digital command signal on line 20, the digital feedback signal on line 32 and the digital error signal on line 34 is shown in FIG. 1A.

The digital error signal on line 34 is demodulated by the pulse width-to-amplitude demodulator 18 to provide a continuous variable amplitude error signal, $\epsilon'$ on line 36, which can be handled directly by the analog power elements of the servo motor 10. The demodulation process consists of, integration, sample, hold and re-set, such that the amplitude sensitivity of $\epsilon'$ is effectively linear with no dead zone. The continuous error signal $\epsilon'$ has a zero order hold staircase granularity (as shown at line 36 in FIG. 1) which granularity smooths to zero as the digital error signal goes to zero pulse width.

The demodulation phase lag resulting from discreet data sampling in the pulse width-to-amplitude demodulator 18 is contained within the closed servo loop and therefore does not add to overall system phase lag measured between the servo output 28 and the loop input on line 20.

Figure 2:
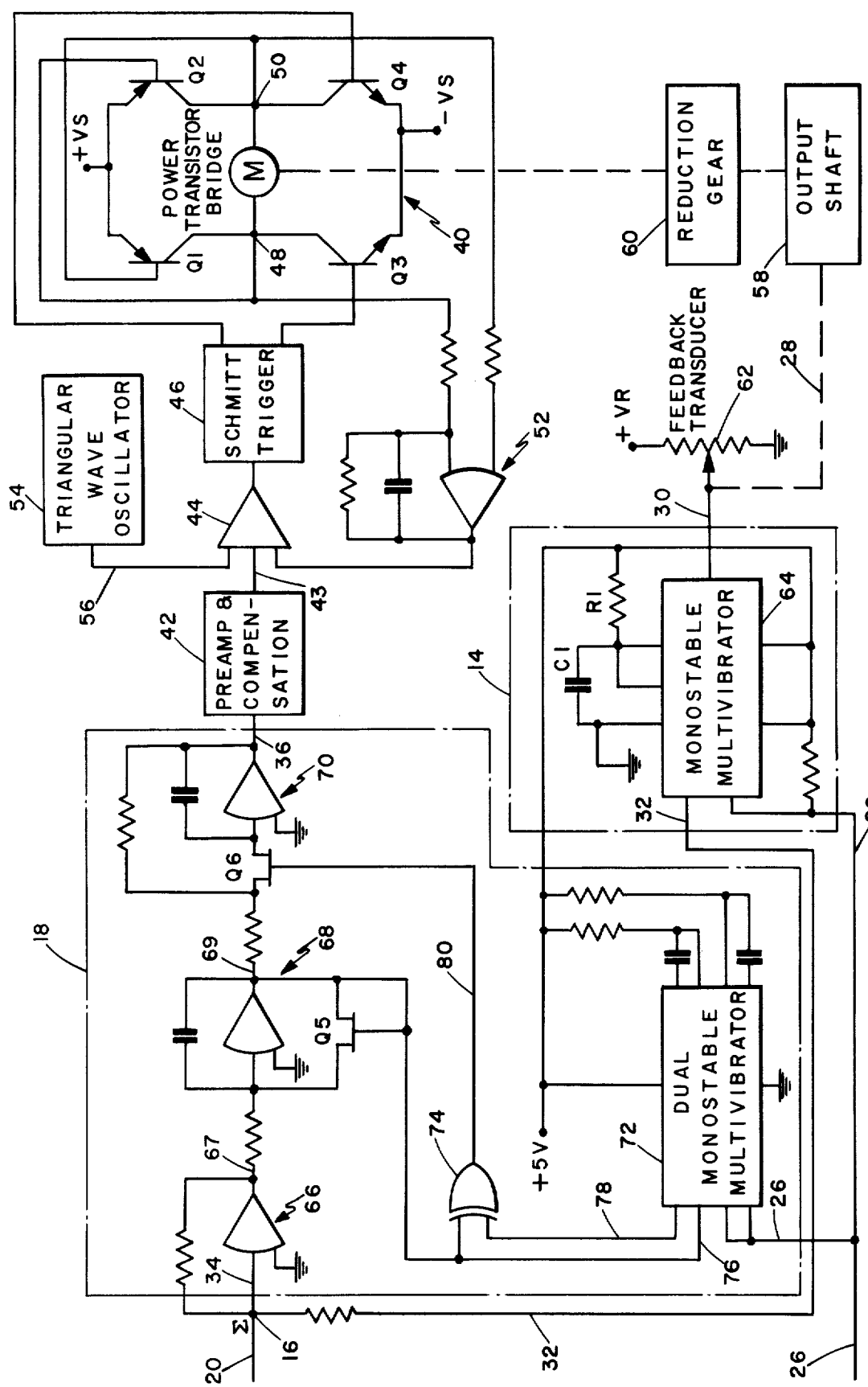
FIG. 2 is a schematic circuit diagram of the components of the servo loop of FIG. 1.

A preferred embodiment of the servo loop of the servo system of FIG. 1 is shown in the schematic circuit diagram of FIG. 2.

An electric direct drive servo motor 38 is controlled by a power transistor bridge circuit 40 in response to the continuous variable amplitude error signal on line 36. The bridge circuit 40 includes power transistors Q1, Q2, Q3 and Q4. These power transistors are connected so that transistor Q1 and Q4 conduct when transistors Q2 and Q3 are not conducting or vice versa.

The continuous error signal on line 36 is amplified by a preamplifier and compensation network 42, and provided on line 43 to a switching amplifier 44. The switching amplifier 44 controls switching within the power transistor bridge 40 by means of a Schmitt trigger circuit 46.

The bridge 40 is controlled by the Schmitt trigger 46 to reverse the direction of conduction across the servo motor terminals 48 and 50. Conduction between the power source terminals $\pm V_S$, is either through the transistor pair Q1 and Q4, or the transistor pair Q2 and Q3. A closed loop feedback voltage is provided from the motor terminal 48, 50 to the switching amplifier 44 by a feedback amplifier 52 so that a limit cycle is set-up by the action of the Schmitt trigger 46. Limit cycle switching frequency entrainment in the 5 to 10 KHz vicinity is also provided by the triangular wave generator 54 connected by line 56 to the switching amplifier 44. The action of the switching is to use the power transistors Q1, Q2, Q3, Q4 in only the saturated and off conditions to maximize power efficiency and linearize the output. The actual output across the motor terminals 48, 50 is a time modulated voltage square wave at the switching frequency. Linearization of the switching amplifier 44 output is achieved by time modulation such that the effective voltage applied to the servo motor 38 is proportional to the switching amplifier input signal on line 43 from the servo pre-amplifer and compensation network 42.

The servo motor output shaft 58 is coupled to the servo motor 38 by a mechanical reduction gear 60.

A voltage dividing feedback transducer 62 senses the variable output 28 of the servo motor from the output shaft 58 and provides a variable amplitude signal on line 30 to a monostable multivibrator 64 in the synchronous pulse forming network 14. The monostable multivibrator 64 converts the variable amplitude feedback signal on line 30 to a proportional pulse width modulated digital feedback signal on line 32. The digital feedback signal on line 32 is provided at the predetermined frame rate in response to the frame pulse signal on line 26. At the beginning of each frame, as defined by the frame pulse signal on line 26, the frame pulse switches the output of the multivibrator 64 from binary "0" to binary "1", to form an output pulse on line 32 having a duration proportional to the voltage amplitude of the signal on line 30 from the feedback transducer 62 as determined by the values of the network components R1 and C1 at the multivibrator control terminals.

The digital command signal on line 20 is summed with the digital feedback signal on line 32 at summing junction 16 to provide a digital error signal on line 34.

The pulse width-to-amplitude demodulator 18 includes an amplifier 66 for amplifying the digital error signal on line 34, an integrator 68, zero order hold sampler 70, a dual monostable multivibrator 72 and an exclusive OR logic element 74.

The integrator 68 integrates the amplified digital error signal on line 67 to provide an integrated error signal on line 69. The zero order hold sampler 70 samples the amplitude of the integrated error signal on line 69 to provide the continuous variable amplitude output signal on line 36. The sampled amplitude is held for a full frame period as defined by the frame pulse signal on line 26. The frame pulse signal on line 26 is provided to the dual monostable multivibrator 72.

The integrator 68 includes a first FET switch Q5 for enabling the integration and for resetting the integrator 68. The zero order hold sampler 70 includes a second FET switch Q6 for enabling the sampling.

The dual monostable multivibrator 72 responds to the frame pulse signal on line 26 to provide a first switching signal on line 76 and a second switching signal on line 78. The first switching signal on line 76 has a duration greater than the maximum duration of any pulse in the pulse width modulated digital error signal on line 32 and the second switching signal on line 78 has a duration that is slightly less than the duration of the first switching signal on line 76.

The exclusive OR logic element 74 has its inputs connected to receive the first and second switching signals on lines 76 and 78 and its output connected via line 80 to the second FET switch Q6.

The dual monostable multivibrator 72 provides the first switching signal on line 76 to the first FET switch Q5 for causing the first FET switch Q5 to enable the integrator 68 to integrate the amplified digital error signal on line 67 over the duration of the first switching signal on line 76 and to reset the integrator 68 for integrating each successive pulse in the digital error signal on line 67 upon the termination of the first switching signal on line 76.

The integration interval is set by the first switching signal on line 76 such that the first FET switch Q5 is open longer than the maximum design difference pulse width, as defined by the frame pulse signal on line 26.

The dual monostable multivibrator 72 also provides both the first and second switching signal on lines 76 and 78 to the exclusive OR logic element 74 in a sequence that causes the second FET switch Q6 to enable the zero order hold sampler 70 to sample the integrated error signal on line 69 during a short interval just before the integrator 68 is reset by closure of the first FET switch Q5.

This short interval is the slight difference between the durations of the first and second switching signals on lines 76 and 78.

Figure 3:
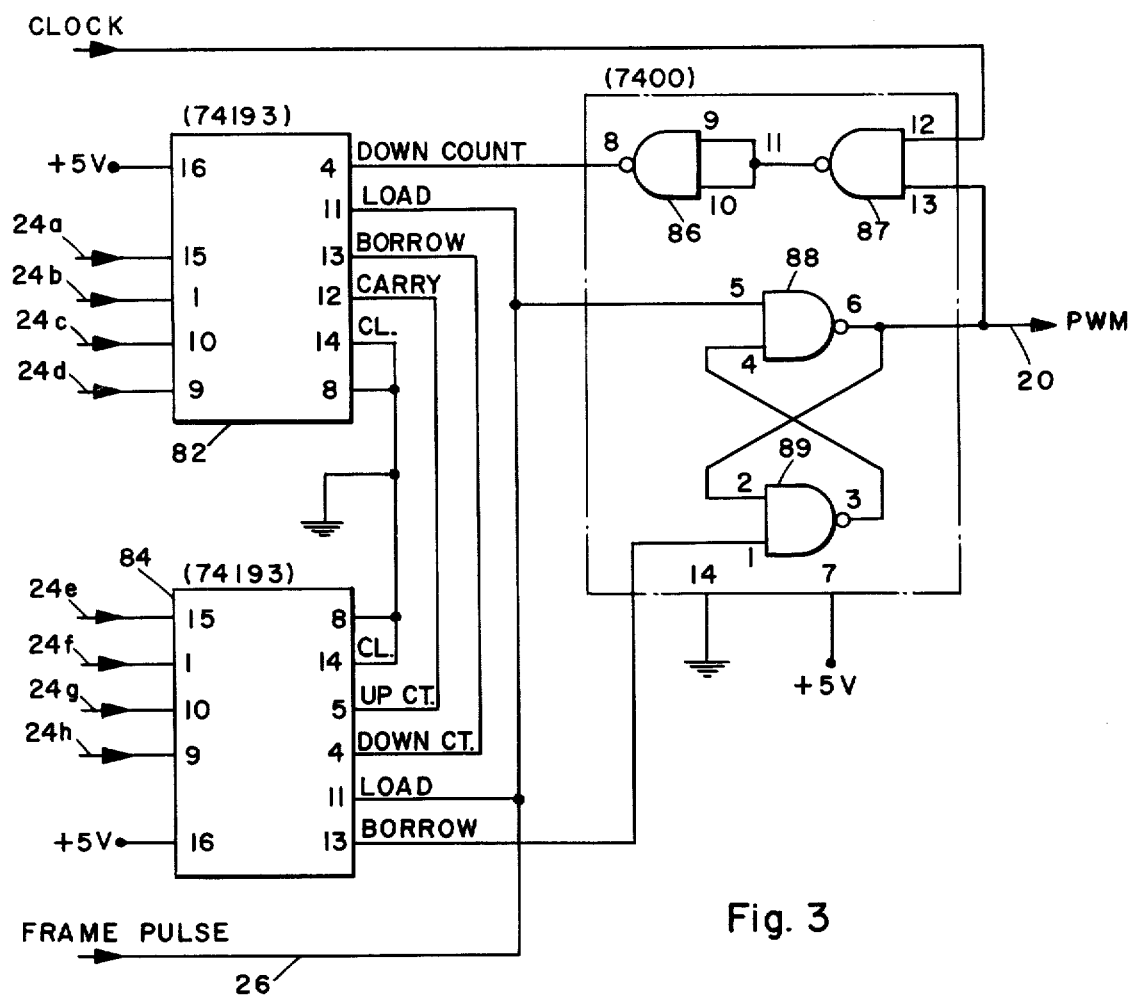
FIG. 3 is a schematic circuit diagram of the pulse code converter of the servo system of FIG. 1.

A schematic circuit diagram of a preferred embodiment of the pulse code converter 22 of the servo system of FIG. 1 is shown in FIG. 3. The pulse code converter 22 includes two integrated circuit counters 82 and 84 and four integrated circuit NAND gates 86, 87, 88, 89 connected as shown in FIG. 3. The counters 82, 84 are No. 74193 integrated circuits and the NAND gates 86, 87, 88, 89 are included in a No. 7400 integrated circuit package. The respective "down count", "load", "borrow", "carry", "clock", and "up count" terminals of the counters 82 and 84 are interconnected as shown in FIG. 3. The "load" terminals of the counters 82 and 84 also are both connected to one input of the NAND gate 88. The "borrow" terminal of the counter 84 is connected to one input of the NAND gate 89. The "down count" terminal of the counter 82 is connected to the output of the NAND gate 86.

The pulse code converter converts a pulse code modulated digital binary signal received on lines 24a–24h to a pulse width modulated signal that is provided on line 20. The least significant bits of the binary signal are received by the counter 82 on lines 24a–24d, and the most significant bits of the binary signal are received by the counter 84 on lines 24e–24h.

A high frequency clock signal is provided on line 90 to one input of the NAND gate 87. The frame pulse signal received on line 26 from the same digital processor as the binary signal on lines 24a–24h, is provided to one input of the NAND gate 88 and to the load terminals of the two counters 82 and 84.

The PWM digital signal on line 20 has a pulse width proportional to the value of the binary word received by the counters 82 and 84 on lines 24a–24h. Although only two four-bit binary counters 82, 84 are shown in FIG. 3, the system is not limited to the binary word size shown.

Figure 4:
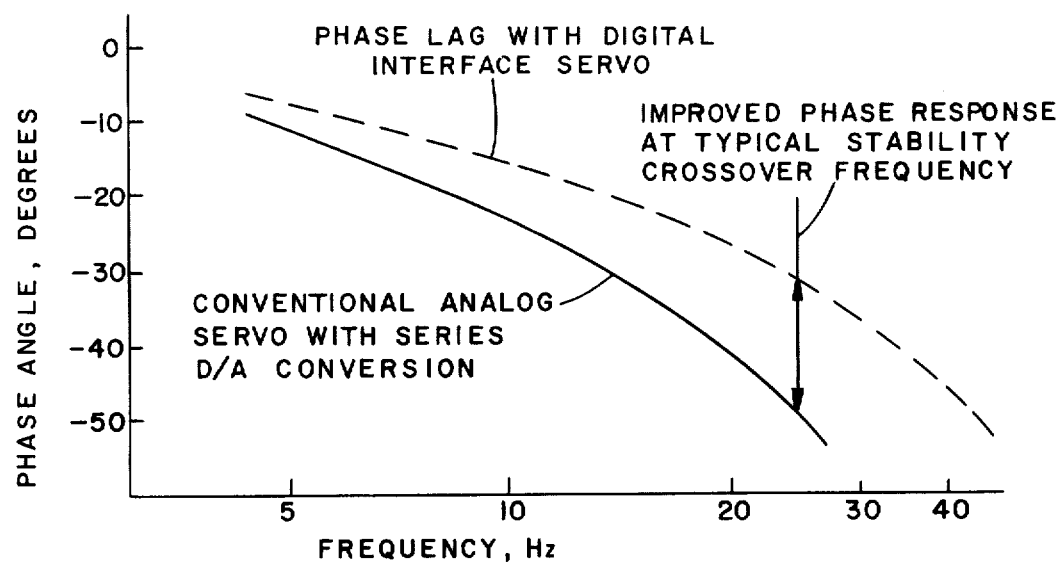
FIG. 4 is a graph showing the improvement in decreased phase lag provided by the servo system of the present invention.

FIG. 4 illustrates the improvement in decreased phase lag provided by the servo system of the present invention compared to phase lag in an analog servo system wherein the D/A conversion function is performed in series with the servo loop rather than within the loop, as in the present invention. The curves of FIG. 4 are plotted for a frame pulse rate of 250 Hz. The upper curve shows the phase lag with the servo system of the present invention. The lower curve shows the phase lag with a conventional analog servo system with series D/A conversion. The improved system reduces phase lag by about 20 degrees at a typical missle control system stability crossover frequency of 25 Hz.

I claim:

1. A servo system wherein a servo motor is continuously controlled in response to a pulse width modulated digital command signal, comprising:

a servo motor having a variable output that is controlled in response to a variable amplitude error signal;

first means for providing a pulse width modulated digital command signal for controlling said variable output of said motor, wherein said digital command signal is provided at a predetermined frame rate in response to a frame pulse signal;

second means for sensing said variable output and for providing a variable amplitude feedback signal indicative of said variable output;

third means for converting said variable amplitude feedback signal to a proportional pulse width modulated digital feedback signal, wherein said digital feedback signal is provided at said predetermined frame rate and in synchronization with said digital command signal;

fourth means for summing said digital command signal with said digital feedback signal to provide a digital error signal; and fifth means for converting said digital error signal to a continuous variable amplitude error signal for continuously controlling said variable output of said servo motor.

2. A servo system according to claim 1, wherein and the fifth means comprises:

sixth means for integrating said digital error signal to provide an integrated error signal; and seventh means for sampling the amplitude of said integrated error signal to provide said continuous variable amplitude output signal, wherein said sampled amplitude is held for a full frame period as defined by said frame pulse signal.

3. A servo system according to claim 2, wherein the sixth means includes a first switching means for enabling said integration and for resetting the sixth means, and the seventh means includes a second switching means for enabling said sampling, and the fifth means further comprises eighth means for providing a first switching signal having a duration greater than the maximum duration of any pulse in said pulse width modulated digital error signal, and a second switching signal having a duration that is slightly less than the duration of said first switching signal; and an exclusive OR logic element having its inputs connected to receive said first and second switching signals and its output connected to the second switching means;

wherein the eighth means also is connected to provide said first switching signal to the first switching means for causing the first switching means to enable the sixth means to integrate said digital error signal over the duration of said first switching signal and to reset the sixth means for integrating each successive pulse in said digital error signal upon the termination of said first switching signal; and to provide said first and second switching signals to the exclusive OR logic element in a sequence to cause the second switching means to enable the seventh means to sample said integrated error signal during a short interval just before the sixth means is reset.

4. A system for continuously controlling a variable output of a servo motor in response to a pulse width modulated digital command signal, comprising:

first means for receiving a pulse width modulated digital command signal for controlling said variable output of said motor, wherein said digital command signal is received at a predetermined frame rate in response to a frame pulse signal;

second means for receiving a variable amplitude feedback signal indicative of said variable output;

third means for coverting said variable amplitude feedback signal to a proportional pulse width modulated digital feedback signal, wherein said digital feedback signal is provided at said predetermined frame rate and in synchronization with said digital command signal;

fourth means for summing said digital command signal with said digital feedback signal to provide a digital error signal; and fifth means for converting said digital error signal to a continuous variable amplitude error signal for continuously controlling said variable output of said servo motor.

5. A system according to claim 4, wherein the fifth means comprises:

sixth means for integrating said digital error signal to provide an integrated error signal; and seventh means for sampling the amplitude of said integrated error signal to provide said continuous variable amplitude output signal, wherein said sampled amplitude is held for a full frame period as defined by said frame pulse signal.

6. A system according to claim 5, wherein the sixth means includes a first switching means for enabling said integration and for resetting the sixth means, and the seventh means includes a second switching means for enabling said sampling, and the fifth means further comprise:

eighth means for providing a first switching signal having a duration greater than the maximum duration of any pulse in said pulse width modulated digital error signal, and a second switching signal having a duration that is slightly less than the duration of said first switching signal; and an exclusive OR logic element having its inputs connected to receive said first and second switching signals and its output connected to the second switching means;

wherein the eighth means also is connected to provide said first switching signal to the first switching means for causing the first switching means to enable the sixth means to integrate said digital error signal over the duration of said first switching signal and to reset the sixth means for integrating each successive pulse in said digital error signal upon the termination of said first switching signal; and to provide said first and second switching signals to the exclusive OR logic element in a sequence to cause the second switching means to enable the seventh means to sample said integrated error signal during a short interval just before the sixth means is reset.

* * * * *